United States Patent [19]
Guillot, Jr.

[11] Patent Number: 6,028,166
[45] Date of Patent: Feb. 22, 2000

[54] METHOD AND APPARATUS FOR GENERATING A CONTINUOUS SOURCE OF MIXED AND DEGASSED RESIN

[75] Inventor: Joseph Martin Guillot, Jr., Plano, Tex.

[73] Assignee: Dallas Semiconductor Corporation, Dallas, Tex.

[21] Appl. No.: 09/088,756

[22] Filed: Jun. 2, 1998

[51] Int. Cl.$^7$ ....................................................... C08F 6/06
[52] U.S. Cl. ............................................................ 528/502
[58] Field of Search ............................................... 528/502

[56] References Cited

U.S. PATENT DOCUMENTS

| | | | |
|---|---|---|---|
| Re. 28,541 | 9/1975 | Ryan | 260/18 |
| 4,366,305 | 12/1982 | Amemiya | 528/230 |
| 4,372,758 | 2/1983 | Bobst | 55/48 |
| 4,670,538 | 6/1987 | Erard | 528/486 |
| 4,820,463 | 4/1989 | Raufast | 264/68 |
| 4,904,430 | 2/1990 | Yamada | 264/102 |
| 5,024,531 | 6/1991 | Will | 366/75 |
| 5,637,268 | 6/1997 | Slattery | 264/102 |

*Primary Examiner*—Paul R. Michl
*Attorney, Agent, or Firm*—Jenkens & Gilchrist, P.C.

[57] ABSTRACT

A method and apparatus for generating mixed and degassed resin. Resin is added to, and stored in, a feed tank where air is forced into the resin from the bottom of the tank to mix the resin. The resin is drawn into a hold tank through a feed-to-hold tank tube by creating a vacuum within the hold tank. Resin flows out of the tube and onto a rotating plate located within the hold tank. The rotating plate provides a surface area for degassing the resin and further directs the resin to an inner surface of the hold tank which provides additional surface area for degassing the resin. A hold tank proximity sensor detects when the hold tank is full of resin and the vacuum is terminated. A low level proximity sensor detects the absence of resin in a dispense tank and a crossover valve is opened, air pressure is applied to the hold tank and resin is forced from the hold tank and into the dispense tank via a hold-to-dispense tank tube. A high level proximity sensor detects the presence of resin in the dispense tank and the crossover valve is closed and the application of air pressure to the hold tank is terminated. A controller controls operation and the process which is continually repeated such that the dispense tank always has a ready supply of mixed and degassed resin.

8 Claims, 2 Drawing Sheets

METHOD AND APPARATUS FOR GENERATING A CONTINUOUS SOURCE OF MIXED AND DEGASSED RESIN

FIELD OF THE INVENTION

The present invention pertains in general to the preparation and dispensing of resin prior to mixing it with a catalyst to form epoxy, and in particular, but not by way of limitation, to a method and apparatus for generating a continuous source of mixed and degassed resin.

BACKGROUND OF THE INVENTION

Epoxy is used in many applications including the encapsulation of such items as semiconductors and electronic circuitry modules. Epoxy is formed by mixing a resin with a catalyst in appropriate ratios and then baking the resin and catalyst mixture. Various devices are used to combine the resin and catalyst in the appropriate ratio and dispense the resin and catalyst mixture in an appropriate manner depending on the desired application. Such devices, however, require that the supply of mixed and degassed resin be available prior to dispensing.

While the catalyst is a free flowing liquid having a low viscosity on the order of seven hundred and fifty centipoise (cPs), resin is a highly viscous liquid with a viscosity on the order of seven thousand five hundred cPs. The low viscosity of the catalyst allows air bubbles, which may be present in the catalyst, to easily exit the catalyst. On the other hand, the highly viscous nature of the resin, due in part to the large amount of filler which constitutes the resin, results in air bubbles becoming trapped within the resin. Therefore, in addition to mixing the resin to uniformly distribute the filler, the resin is degassed prior to its combination with the catalyst. Currently, when devices which combine and dispense the resin and catalyst run out of; or otherwise require the addition of resin, the devices are shut down while additional resin is added, mixed and degassed. The current devices are, therefore, inefficient in that during the downtime required to resupply the devices with resin, the devices are unable to dispense the resin and catalyst mixture.

It would be advantageous, therefore, to devise a method and apparatus for generating a continuous source of mixed and degassed resin for use in devices which combine and dispense a resin and catalyst mixture.

SUMMARY OF THE INVENTION

The present invention comprises a method and apparatus for generating mixed and degassed resin. Resin is added to, and stored in, a feed tank where air is forced into the resin from the bottom of the tank to mix the resin. The resin is drawn into a hold tank through a feed-to-hold tank tube by creating a vacuum within the hold tank.

Resin flows out of the tube and onto a rotating plate located within the hold tank. The rotating plate provides a surface area for degassing the resin and further directs the resin to an inner surface of the hold tank which provides additional surface area for degassing the resin.

A hold tank proximity sensor detects when the hold tank is full of resin and the vacuum is terminated. A low level proximity sensor detects the absence of resin in a dispense tank and a crossover valve is opened, air pressure is applied to the hold tank and resin is forced from the hold tank and into the dispense tank via a hold-to-dispense tank tube. A high level proximity sensor detects the presence of resin in the dispense tank and the crossover valve is closed and the application of air pressure to the hold tank is terminated.

A controller controls operation and the process which is continually repeated such that the dispense tank always has a ready supply of mixed and degassed resin.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

Figure 1:
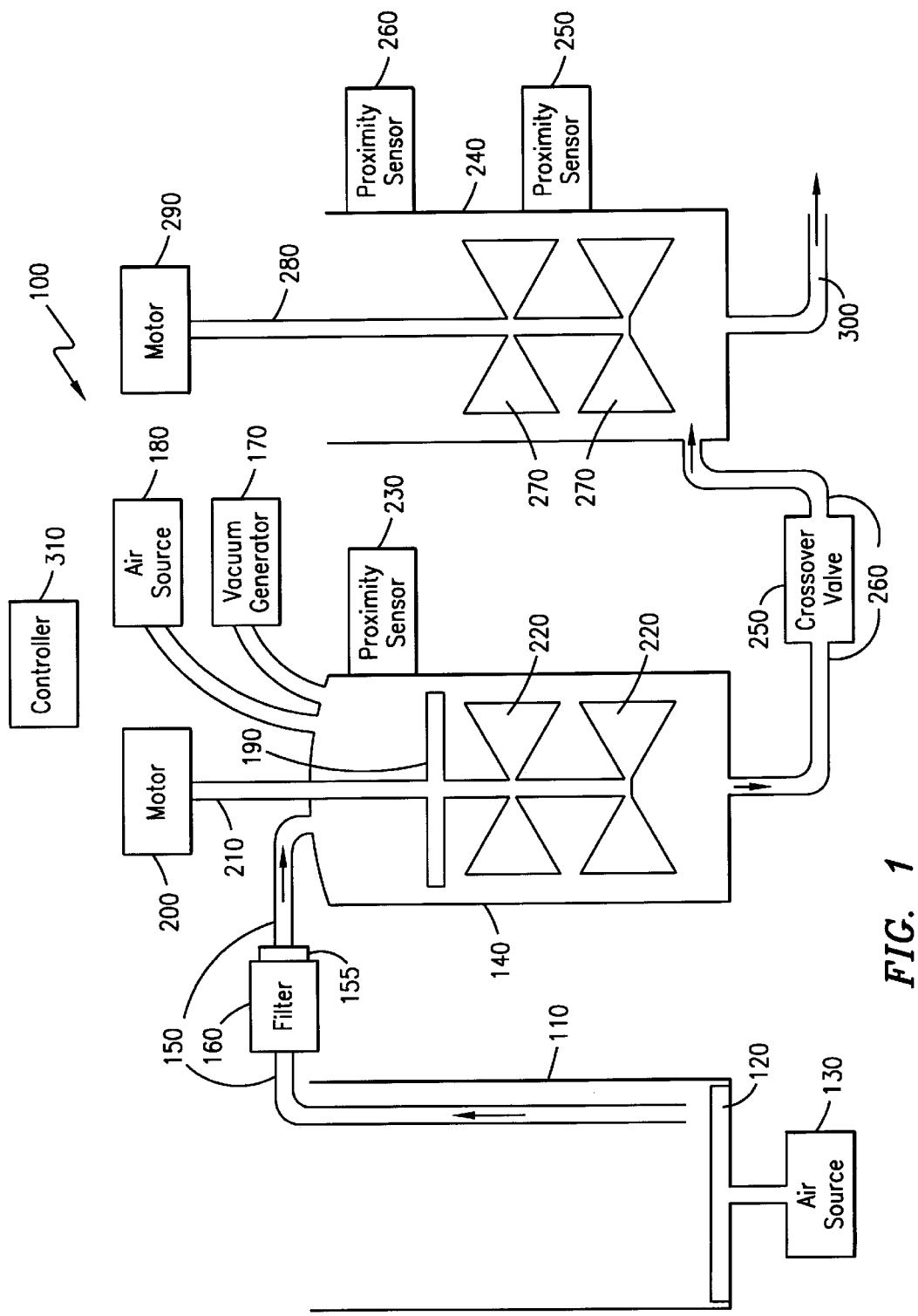
FIG. 1 is a functional block diagram of an apparatus for generating a continuous source of mixed and degassed resin for use with devices which combine and dispense a resin and catalyst mixture.

Referring now to FIG. 1, there is illustrated a functional block diagram of an apparatus, shown generally at 100, for generating a continuous source of mixed and degassed resin for use with devices which combine and dispense a resin and catalyst mixture. Unprepared resin is added to a feed tank 110 as needed. The resin is mixed by forcing air from the bottom of the feed tank 110 via an aerator 120 which receives a supply of air from a first air source 130. By introducing air at the bottom of the feed tank 110, the resin "bubbles" as air is forced to the top of the resin thereby mixing the resin. Although most of the air introduced by the aerator 120 escapes from the resin, a significant portion of the air becomes trapped within the resin.

From the feed tank 110, the resin is drawn into the top of a hold tank 140 via a feed-to-hold tank tube 150 and a filter 160 as indicated by arrows shown within the feed-to-hold tank tube 150. A valve 155, which may be a discrete component or part of the filter 160, allows the flow of resin from the feed tank 110 to the hold tank 140 when open and prevents the flow of resin from the hold tank 140 to the feed tank 110 when closed.

While the feed tank 110 can be either an open tank (as shown) or a tank which can be closed, the hold tank 140 is a closed tank which is capable of both pressurization and holding a vacuum. Pressure is generated within the hold tank 140 by a second air source 180 while a vacuum is created within the hold tank 140 by a vacuum generator 170. The outlet for the air source 180 and the inlet for the vacuum generator 170 is located near the top of the hold tank 140 and above the resin within the hold tank 140. Although the description of the present invention describes the use of the first air source 130 and the second air source 180, it is understood that a single air source, with regulators to reduce the pressure to appropriate levels for the aerator 120 and the hold tank 140, may be used as an alternative. Furthermore, while the description of the present invention describes the use of air as the gas for aeration and pressurization, it is understood that any appropriate gas may be used.

A rotating plate 190 is located within, and is positioned near the top of the hold tank 140. The rotating plate 190 has a diameter slightly less than that of the hold tank 140 such that the rotating plate 190 is able to rotate within the hold tank 140 while at the same time allowing resin to flow from the top of the rotating plate 190, past an outer edge of the rotating plate 190 to the bottom of the hold tank 140 along the inside wall of the hold tank 140. The rotating plate 190 is attached to a first motor 200 via a first shaft 210 which is coaxial with the rotating plate 190 and the hold tank 140. Also attached to the first shaft 210 is one or more "bow-ties" 220. The bow-ties 220 are plates which are used to stir the resin while in the hold tank 140 to prevent settling of the resin. While it is understood that the first motor 200 may rotate the first shaft 210 at a variety of speeds, favorable results have been obtained at a rotational speed of between fifty to one hundred Revolutions Per Minute (RPM).

Resin is drawn into the hold tank 140 by activating the vacuum generator 170 to create a vacuum within the hold tank 140. The vacuum, within the hold tank 140, draws resin from the feed tank 110, through the feed-to-hold tank tube 150 and into the top of the hold tank 140. The feed-to-hold tank tube 150 enters the hold tank 140 above, and near the center of, the rotating plate 190. As the resin exists the feed-to-hold tank tube 150 and falls onto the rotating plate 190, the resin is spread across the rotating plate 190 and falls into the lower portion of the hold tank 140 along the inner surface of the hold tank 140. The surface area of the rotating plate 190 and the inner surface of the hold tank 140 provide a large surface area over which the resin is degassed. Degassing of the resin is further enhanced by the vacuum which is created within the hold tank 140 by the vacuum generator 170.

A hold tank proximity sensor 230 is positioned outside, and near the top of, the hold tank 140 somewhat above the rotating plate 190. The hold tank proximity sensor 230 detects when the quantity of resin within the hold tank 140 has risen to the level of the hold tank proximity sensor 230. Thus, the hold tank proximity sensor detects when the hold tank 140 has filled to a level somewhat above the rotating plate 190.

Resin is added to a dispense tank 240 by opening a crossover valve 250 which allows resin to be forced from the hold tank 140 into the dispense tank 240 via a hold-to-dispense tank tube 260 as indicated by the arrows shown within the hold-to-dispense tank tube 260. Resin is added to the dispense tank 240 when a low level proximity sensor 250, located near the bottom of the dispense tank 240, detects that resin has fallen to a level below the low level proximity sensor 250. The outlet of the hold-to-dispense tank tube 260 on the dispense tank 240 is located below the low level proximity sensor 250 such that resin is added to the dispense tank 240 before the level of resin in the dispense tank falls below the outlet of the hold-to-dispense tank tube 260. Adding resin to the dispense tank 240 before falling to a level below the outlet of the hold-to-dispense tank tube 260 insures that air is not introduced into the resin.

The resin is forced from the hold tank 140, through the hold-to-dispense tank tube 260 and into the dispense tank 240 by deactivating the vacuum generator 170 and activating the second air source 180 to pressurize the hold tank 140. Resin continues to be added to the dispense tank 240 until a high level proximity sensor 260, located near the top of the dispense tank 240, detects that resin has risen to a level within the dispense tank 240 coinciding with the location of the high level proximity sensor 260 at which time the crossover valve 250 is closed.

As with the hold tank 140, the dispense tank 240 includes one or more "bow-ties" 270 which are used to stir the resin while in the dispense tank 240. The "bow-ties" 270 are attached to a second motor 290 via a second shaft 280. Although the resin enters the dispense tank 240 already mixed, the "bow-ties" 270 are used to maintain the resin in a mixed state during periods when the dispensing of resin, via a dispense tube 300, is halted for an extended period of time.

Functional control of the apparatus 100 is effectuated using a controller 310. Among other functions, the controller controls operation of the first air source 140, the second air source 180, the vacuum generator 170, the crossover valve 250, the first motor 200 and the second motor 290. Among other inputs, the controller receives signals from the hold tank proximity sensor 230, indicating when the hold tank 140 has filled with resin, the high level proximity sensor 260, indicating when the dispense tank 240 has filled with resin, and the low level proximity sensor 250, indicating when the dispense tank 240 has emptied of resin. In the preferred embodiment of the present invention, the feed tank 110, the hold tank 140 and the dispense tank 240 have the same capacity, for example five gallons. The hold tank proximity sensor 230, the high level proximity sensor 260 and the low level proximity sensor 250 detect selected levels, for example five gallons, five gallons and two gallons respectively. Although the feed tank 110, the hold tank 140 and the dispense tank 240 each have a capacity of five gallons, in the preferred embodiment of the present invention, resin is transferred from the hold tank 140 to the dispense tank 240 at a rate of three gallons per transfer. It is understood, however, that any size tanks can be used at a variety of transfer rates.

Figure 2:
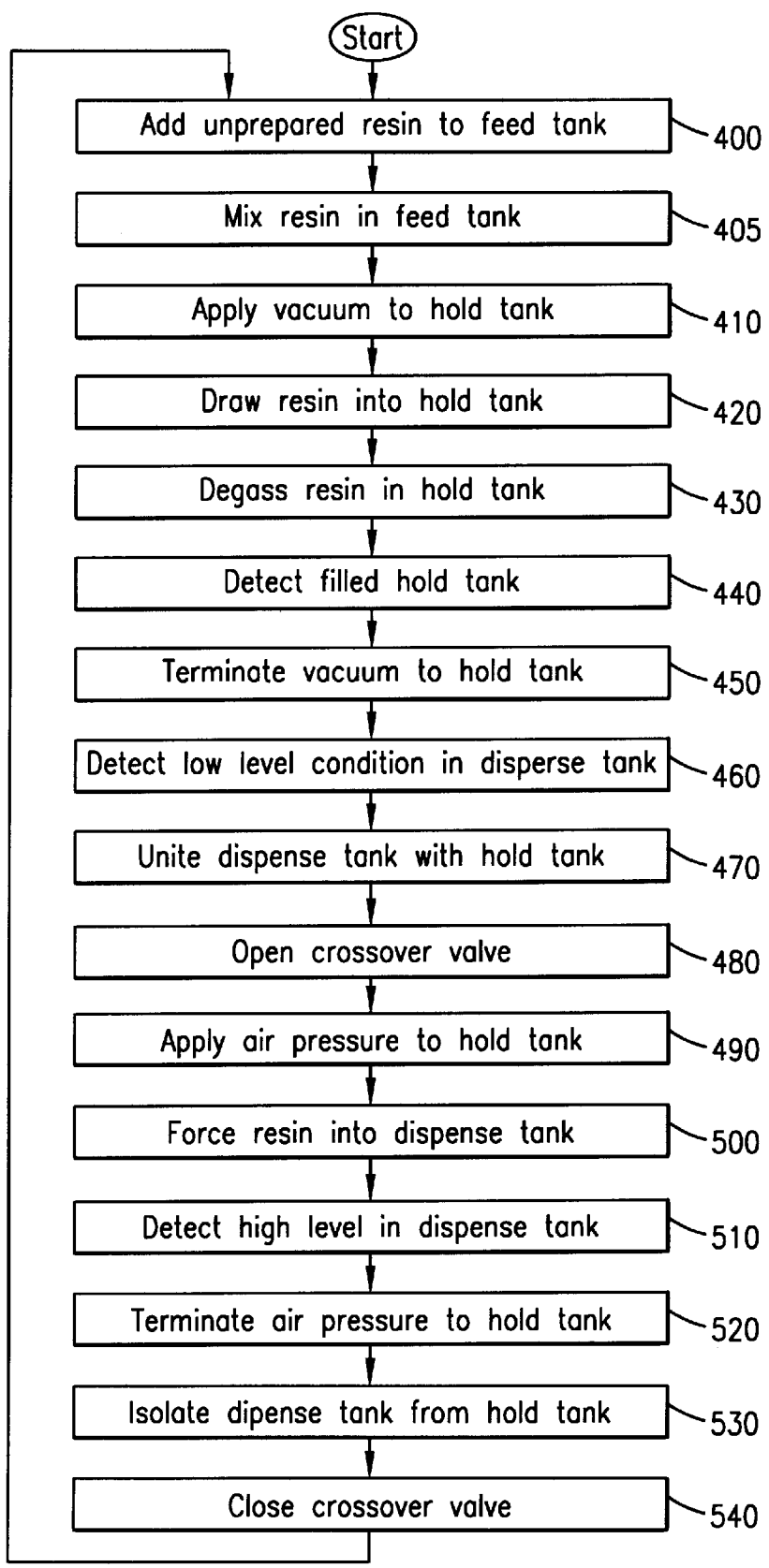
FIG. 2 is a flow diagram of a method for generating a continuous source of mixed and degassed resin for use with devices which combine and dispense a resin and catalyst mixture consistent with the preferred embodiment described in FIG. 1

FIG. 2 is a flow diagram of a method for generating a continuous source of mixed and degassed resin for use with devices which combine and dispense a resin and catalyst mixture consistent with the preferred embodiment described in FIG. 1. Unprepared resin is added to the feed tank 110 (step 400). The resin is mixed (step 405) by forcing air bubbles into the resin from the bottom of the feed tank 110 via an aerator 120. Vacuum pressure is applied to the hold tank 140 (step 410) by activating the vacuum generator 170 and the resin is drawn into the hold tank (step 420) via the feed-to-hold tube 150. The resin in the holding tank 140 is degassed (step 430) by spreading the resin across the surface of the rotating plate 190 and the inner surface of the hold tank 140. The hold tank proximity sensor 230 detects when the hold tank 140 has filled with resin (step 440) and the vacuum pressure to the hold tank 140 is terminated (step 450) by deactivating the vacuum generator 170. As the resin is dispensed from the dispense tank 240 through the dispense tube 300, the level of resin within the dispense tank 240 falls until the low level proximity sensor 250 no longer detects the presence of resin thereby, detecting a low level condition within the dispense tank 240 (step 460). The hold tank 140 is united with the dispense tank 240 (step 470) by opening the crossover valve (step 480). Air pressure is applied to the hold tank 140 (step 490) by activating the second air source 180 and resin is forced into the dispense tank 240 (step 500). A high level of resin, indicative of a filled dispense tank 240, is detected (step 510) by the high level proximity sensor 260 and the air pressure, applied by the second air source 180 to the hold tank 140, is terminated (step 520). The termination of air pressure to the hold tank 140 discontinues the flow of resin from the hold tank 140 into the dispense tank 240 and the hold tank 140 is isolated from the dispense tank 240 (step 530) by closing the crossover valve 265 (step 540). The cycle from steps 400 through 540 is repeated continuously to generate a continuous source of mixed and degassed resin to the dispense tank 240 for dispensing through the dispense tube 300.

Although the preferred embodiment of the apparatus and method of the present invention has been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A method for continuously generating mixed and degassed resin comprising the steps of:

storing resin in a feed tank;

forcing air into the bottom of the feed tank to mix the resin within the feed tank;

drawing resin from the feed tank into a top end of a hold tank;

degassing resin within the hold tank; and forcing resin from a bottom end of the feed tank into a bottom end of a dispense tank.

2. The method, as recited in claim 1, wherein the step of storing resin in the feed tank further comprises the step of adding resin to the feed tank whenever the supply of resin within the feed tank is near depletion.

3. The method, as recited in claim 1, wherein the step of drawing resin from the feed tank into the hold tank comprises the step of applying a vacuum to the hold tank to draw resin from the feed tank through a feed-to-hold tank tube and into the hold tank.

4. The method, as recited in claim 3, further comprising the steps of:

detecting when the hold tank is full; and terminating the vacuum in response to detecting that the hold tank is fun.

5. The method, as recited in claim 1, wherein the step of degassing resin within the hold tank comprises the steps of:

applying the resin onto a rotating plate; and directing the resin toward the inner surface of the hold tank.

6. The method, as recited in claim 1, where the step of forcing resin from the feed tank into a dispense tank comprises the step of applying air pressure within the hold tank to force the resin from the hold tank through a hold-to-dispense tank tube and into the dispense tank.

7. The method, as recited in claim 1, where the step of forcing resin from the feed tank into a dispense tank comprises the steps of:

detecting a low level of resin within the dispense tank;

applying air pressure within the hold tank to force the resin from the hold tank through a hold-to-dispense tank tube and into the dispense tank in response to the detected low level;

detecting a high level of resin within the dispense tank; and terminating the air pressure within the hold tank in response to the detected high level.

8. The method recited in claim 7, further comprising the steps of:

opening a crossover valve located within the hold-to-dispense tank tube in response to the detected low level; and closing the crossover valve in response to the detected high level.

* * * * *